(12) United States Patent
Creemer et al.

(10) Patent No.: US 7,672,993 B2
(45) Date of Patent: *Mar. 2, 2010

(54) METHOD AND APPARATUS FOR WIRELESSLY NETWORKED DISTRIBUTED RESOURCE USAGE FOR DATA GATHERING

(75) Inventors: David Z. Creemer, Palo Alto, CA (US); Roger Flores, Redwood City, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/512,871

(22) Filed: Aug. 29, 2006

(65) Prior Publication Data

US 2007/0271355 A1    Nov. 22, 2007

Related U.S. Application Data

(63) Continuation of application No. 09/893,189, filed on Jun. 26, 2001, now Pat. No. 7,194,512.

(51) Int. Cl.
*G06F 15/16* (2006.01)
(52) U.S. Cl. .................. 709/203; 709/205; 709/217; 709/218; 709/219
(58) Field of Classification Search .............. None
See application file for complete search history.

(56) References Cited

U.S. PATENT DOCUMENTS 5,790,074 A    8/1998    Rangedahl et al.

(Continued)

OTHER PUBLICATIONS

Life in Motion Made Simple-Intellione, printed from the website: http://www.intellione.com/tech_roadway_speed.php, dated Jan. 8, 2007.

(Continued)

*Primary Examiner*—Yves Dalencourt
(74) *Attorney, Agent, or Firm*—Foley & Lardner LLP

(57) ABSTRACT

A method and system for gathering, collecting, and supplying geographically distributed data. In one embodiment, geographically distributed data is gathered in a server-commanded mode, such that the user of an electronic device need not participate in the capturing or transmitting of the data. In another embodiment, a server initiates requests the user of an electronic device to input data and the data then transmitted to the server. In another embodiment, a user initiates the capture of data with an electronic device and the electronic device transmits the data to a computer server. In another embodiment, the gathering of geographically distributed data is accomplished by the user of an electronic device instructing his electronic device to automatically collect input data and the data is then transmitted to a computer server. In embodiments of the present invention, the electronic device is a palm-sized computer system.

27 Claims, 18 Drawing Sheets

U.S. PATENT DOCUMENTS

| | | | |
|---|---|---|---|
| 6,236,933 B1 * | 5/2001 | Lang | 701/117 |
| 6,697,821 B2 | 2/2004 | Ziff et al. | |
| 6,799,032 B2 * | 9/2004 | McDonnell et al. | 455/410 |
| 6,834,285 B1 | 12/2004 | Boris et al. | |
| 6,842,620 B2 | 1/2005 | Smith et al. | |
| 2002/0188522 A1 * | 12/2002 | McCall et al. | 705/26 |
| 2003/0025599 A1 | 2/2003 | Monroe | |
| 2003/0078055 A1 | 4/2003 | Smith et al. | |
| 2005/0079878 A1 | 4/2005 | Smith et al. | |
| 2006/0058941 A1 * | 3/2006 | DeKock et al. | 701/117 |
| 2006/0235833 A1 | 10/2006 | Smith et al. | |
| 2006/0293046 A1 | 12/2006 | Smith | |

OTHER PUBLICATIONS

Companies Eye Cell Phones as Way to Track Traffic Jams, printed from the website: http://www.foxnews.com/printer_friendly_story/0,3566,227603,00.html, dated Jan. 8, 2007.

* cited by examiner

METHOD AND APPARATUS FOR WIRELESSLY NETWORKED DISTRIBUTED RESOURCE USAGE FOR DATA GATHERING

This patent application is a Continuation of commonly-owned patent application Ser. No. 09/893,189, filed on Jun. 26, 2001 now U.S. Pat. No. 7,194,512, entitled "METHOD AND APPARATUS FOR WIRELESSLY NETWORKED DISTRIBUTED RESOURCE USAGE FOR DATA GATHERING", by David Z. Creemer and Roger Flores, which is incorporated herein by reference.

BACKGROUND OF THE INVENTION

1. Field of the Invention

The present invention relates to the field of remote data collection. More specifically, embodiments of the present invention relate to the requesting, transmitting, collecting, storing, reviewing, and publishing of remotely collected data as supplied by an electronic device, e.g., a computer system, a portable computer system, a palmtop computer system, or any other hand-held electronic device that utilizes a display screen, such as a cell phone, a pager, etc.

2. Related Art

Over the last couple of decades, peer-to-peer and server-client computing have been extensively utilized. For example, in the late 1980s, Sun Microsystems' operating system allowed networked computers to share their disk storage across the network. In essence, this provided for sharing a resource, in this case disk storage, amongst many computers. A more recent example is the Napster music-sharing system. In the Napster system, music files are stored across a very large number of personal computers, and users can copy a music file from many different places. Once again, the shared resource is disk storage.

Another example of shared storage resources is provided by Gnutella. From their website at www.gnutella.wego.com: "Gnutella is a fully-distributed information-sharing technology"; and "when you run Gnutella software and connect to the Gnutella Network, you bring with you the information you wanted to make public. That could be nothing, it could be one file, a directory, or your entire hard drive." Essentially, Gnutella provide a means for the user of a personal computer to share any part of the contents of his hard disk with other users on the Internet.

Networked computers have also shared computational resources. A large computational task, such as the factoring of a very large number, can be split into a plurality of smaller tasks, and each smaller task is assigned to a separate computer. A practical example of shared computational resources is the SETI@home project (having a web page at http://setiathome.ssl.berkeley.edu/), where radioastronomy data is collected at a central server, and subsets are parceled out to personal computers over the Internet. The personal computers search the subsets for potential extraterrestrial signals.

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been know as Personal Digital Assistants (PDAs). Many PDAs have a small and flat display screen associated therewith. Also, PDAs are now including a wireless connection to a network, including the Internet, making them candidates for resource sharing. PDAs are generally designed to be light, inexpensive, and power efficient, and this makes them poor candidates for sharing either data storage or computational resources.

PDAs are now including various peripheral input devices, such as microphones, global positioning systems (hereinafter, GPS), and cameras. Since a PDA is, basically, a computer, the numerous types of other input/output devices that have been interfaced to a computer can be interfaced, or incorporated into, a PDA. Such other input/output devices include: video cameras, altimeters, and seismic activity recorders.

In addition to PDAs, other portable electronic devices have display screens and wireless network connections, such as cell phones, electronic pagers, remote control devices and other wireless portable devices. All of these devices have been adapted to display short lists of information on the display screens to help the user organize and display information, e.g., phone records.

User convenience is a very important factor for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device or input data into an electronic device, the less likely the user will perform those tasks. Likewise, the easier information is to obtain, the more likely the portable electronic device will be used to obtain that information and the more likely the portable electronic device will become a part of the user's everyday activities. For electronic devices to be used for resource sharing, the sharing must be very convenient for the user.

The prior art for remote data gathering includes various dedicated devices. An example is a remote weather station for collecting temperature, rainfall, barometric pressure, and other weather-related data. Another example is a location-tracking device attached to migratory animals, used to study animal migration patterns. Unfortunately, present devices for gathering geographically distributed data are dedicated-purpose devices, and are not appropriate for use in the general population of people. Hence, present-day devices are not useful for tasks such as: gathering automobile traffic conditions; opinion polling; and on-the-spot supplying of news information.

SUMMARY OF THE INVENTION

Accordingly, embodiments of the present invention provide a system comprising one or more computer servers and one or more electronic devices having a method for gathering, collecting, and supplying geographically distributed data. Therefore, the present invention allows for: a server to gather geographically distributed data from one or more electronic devices; a server to collect responses from users of electronic devices; and users of electronic devices to supply geographically distributed data to a server. In other words, the present invention provides for a new type of shared resources: geographically distributed data and input from the users who are geographically distributed. The present invention provides these advantages and others not specifically mentioned above but described in the sections to follow.

The present invention provides four modes of collecting data: (1) gathering geographically distributed data in a server-commanded mode, accomplished by a computer server commanding electronic devices to capture and transmit data, such that the user of the electronic device need not participate in the capturing or transmitting, and is, therefore transparent to the user; (2) collecting user responses in a server-initiated mode, accomplished by a computer server requesting the user of an electronic device to input data, the data then transmitted to the server; (3) supplying geographically distributed data in a user-initiated mode, accomplished by a user capturing data with an electronic device, the electronic device transmitting the data to a computer server, and the computer server then storing, selling, or publishing the data; and (4) gathering a body of geographically distributed data in a user-controlled mode, accomplished by the user of an electronic device instructing his electronic device to automatically collect input data, the data then transmitted to a computer server.

The first mode, gathering a body of geographically distributed data in a server-commanded mode, is useful for situations where the user of the electronic device need not be bothered to respond. For example, assuming there are thousands of users with electronic devices in their cars as they commute to work (with the electronic devices turned on, enabled to participate in the gather of data, and equipped with a GPS), a computer server can query all the electronic devices for location and speed in order to generate a overall picture of traffic conditions. This overall picture could then be sent to the users, published on the Internet, or broadcast on television or radio. Similarly, temperature, sound, and even seismic activity could be gathered this way.

For gathering a body of geographically distributed data from a plurality of electronic devices in a server-commanded mode, for a particular embodiment of the invention, a computer server and an electronic device perform the following steps: (1) the computer server selects an electronic device from which to gather data; (2) the computer server requests the current location of the electronic device, and, if it does not already know the types of geographically distributed data that the electronic device can collect, requests this information also; (3) the electronic device receives the request and transmits the requested information; (4) based on this information, the computer server decides whether the electronic device is appropriate to contribute to the body of data, and skips further communication with the electronic device if it is not appropriate to gather the needed data, the electronic device can be inappropriate due to its location; (5) the computer server transmits a command to the electronic device to capture particular type(s) of data; (6) the electronic device receives the command to capture the data; (7) the electronic device captures the geographically distributed data; (8) the electronic device transmits the captured data to the computer server; (9) the computer server receives the captured data; and (10) the computer server stores or processes the received data; and (11) the computer server credits value to an account corresponding to the electronic device.

For gathering data in a server-commanded mode, additional steps may also be of significant value: (A) the electronic device sends a verifiable identity code to the computer, and the computer server uses this code to verify the identity of the transmitting device, thereby avoiding security breaches; (B) the computer server credits value to an account corresponding to selected electronic device, thereby compensating the user of the electronic device for the use of the electronic device; (C) encrypting and decrypting any data so as to keep it private; and (D) the computer server maintaining a list of active electronic devices, adding and subtracting electronic devices to/from the list as users logon/logoff or power-on/power-off their electronic devices.

The second mode, collecting user responses in a server-commanded mode, is useful for situations where input from the user is desired. For example, marketing surveys can be performed where it is up to the user as to whether he will respond. A particularly useful example is the requesting of opinions based on geographic location. For example, the user could be surveyed when leaving a particular type of restaurant (such as McDonald's) as to his experiences. Similarly, a survey could be taken of users located at a particular sporting event (such as the Super Bowl). These surveys could be accompanied by a sales pitch for a particular company or product. If a user participated in a survey collecting responses from people who just ate at McDonald's, an advertisement or coupon for Burger King could be sent to the user if his survey indicated any dissatisfaction. Hence, marketing data and sales could be done in a distributed fashion.

For collecting user responses in a server-initiated mode, for a particular embodiment of the invention, a computer server and an electronic device perform the following steps: (1) the computer server selects the electronic device, the electronic device having a corresponding user; (2) optionally, the computer server requests the current location of the electronic device (needed if the responses are gathered according to current location), the electronic device transmits its current location to the computer server, and the computer server skips further communication with the electronic device if the electronic device's current location is not within a predetermined geographic area; (3) the computer server transmits a command to cause the electronic device to notify its user that a response is requested; (4) the electronic device receives the command to solicit a user response from the user; (5) the electronic device notifies the user that a response is requested; (6) the computer server transmits the information to which the user of the electronic device is to respond; (7) the electronic device receives the information to which the user of the electronic device is to respond; (8) the electronic device receives the user response from the user; (9) the electronic device transmits the received user response; (10) the computer server receives the user response from the electronic device; and (11) the computer server stores or processes the user response;

For collecting user responses in a server-initiated mode, additional steps may also be of significant value: (A) the electronic device sends a verifiable identity code to the computer, and the computer server uses this code to verify the identity of the transmitting device, thereby avoiding security breaches; (B) the computer server credits value to an account corresponding to the selected electronic device, thereby compensating the user of the electronic device for his response; (C) encrypting and decrypting any data so as to keep it private; and (D) the computer server maintaining a list of active electronic devices, adding and subtracting electronic devices to/from the list as users logon/logoff or power-on/power-off their electronic devices.

The third mode, supplying geographically distributed data in a user-initiated mode, is useful for situations where the user of the electronic device wants to capture data that is local to him and distribute it to a wider audience. For example, the user of an electronic device could be the witness of an accident, and use his electronic device to capture video images (assuming the electronic device includes a video capture mechanism), upload them immediately to a computer server, and then the computer server can distribute or publish the video images as desired. This mode of operation makes the user of an electronic device a roving reporter. The invention also includes methods for reviewing the submitted data before it is distributed or published. The review is important to filter out inappropriate, uninteresting, and redundant news.

For supplying geographically distributed data in a user-initiated mode, for a particular embodiment of the invention, a computer server and an electronic device perform the following steps: (1) the electronic device receives a command from the user to capture data; (2) the electronic device captures the data; (3) the electronic device transmits the captured data; (4) the computer server receives the supplied geographically distributed data from the electronic device; (5) the computer server stores the received geographically distributed data; (6) the computer server makes the stored geographically distributed data accessible to a predetermined set of editors; (7) the computer server receives approval to publish from at least one of the editors; (8) the computer server credits value to an account corresponding to the electronic device; and (9) the computer server credits value to an account corresponding to the participating editors.

For supplying geographically distributed data in a user-initiated mode, additional steps may also be of significant value: (A) the electronic device sends a verifiable identity code to the computer, and the computer server uses this code to verify the identity of the transmitting device, thereby avoiding security breaches; (B) encrypting and decrypting any data so as to keep it private; and (C) the computer server maintaining a list of active electronic devices, adding and subtracting electronic devices to/from the list as users logon/logoff or power-on/power-off their electronic devices.

The fourth mode, gathering a body of geographically distributed data in a user-controlled mode, is useful for situations where the user of the electronic device need not be bothered to respond, but has the electronic device automatically transmit the gathered data without receiving a command from the server. For example, assuming there are thousands of users with electronic devices in their cars as they commute to work (with the electronic devices turned on, enabled to participate in the gather of data, and equipped with a GPS), the entire set of electronic devices periodically transmit their location and speed in order to generate an overall picture of traffic conditions. This overall picture could then be sent to users, published on the Internet, or broadcast on television or radio. Similarly, temperature, sound, and even seismic activity could be gathered this way.

For gathering a body of geographically distributed data from a plurality of electronic devices in a user-controllable mode, for a particular embodiment of the invention, a computer server and an electronic device perform the following steps: (1) if the electronic device is enabled for gathering data, the electronic device waits for the correct time to capture data; (2) the electronic device captures the types of data as selected by the user; (3) the electronic device transmits the captured data to the computer server; (4) the computer server receives the captured data; (5) the computer server verifies the identity of the transmitting electronic device; (6) the computer server stores or processes the received data; and (7) the computer server credits value to an account corresponding to the transmitting electronic device.

In all four of the above described modes of collecting geographically distributed data, the type of data can be one or more of the following: position, velocity, acceleration, temperature, altitude, air pressure, direction, audio, video, still pictures, vibration, and time of day. In addition to these, any other type of data that can be captured by a computer can be collected by the above methods.

DETAILED DESCRIPTION OF THE INVENTION

Figure 1:
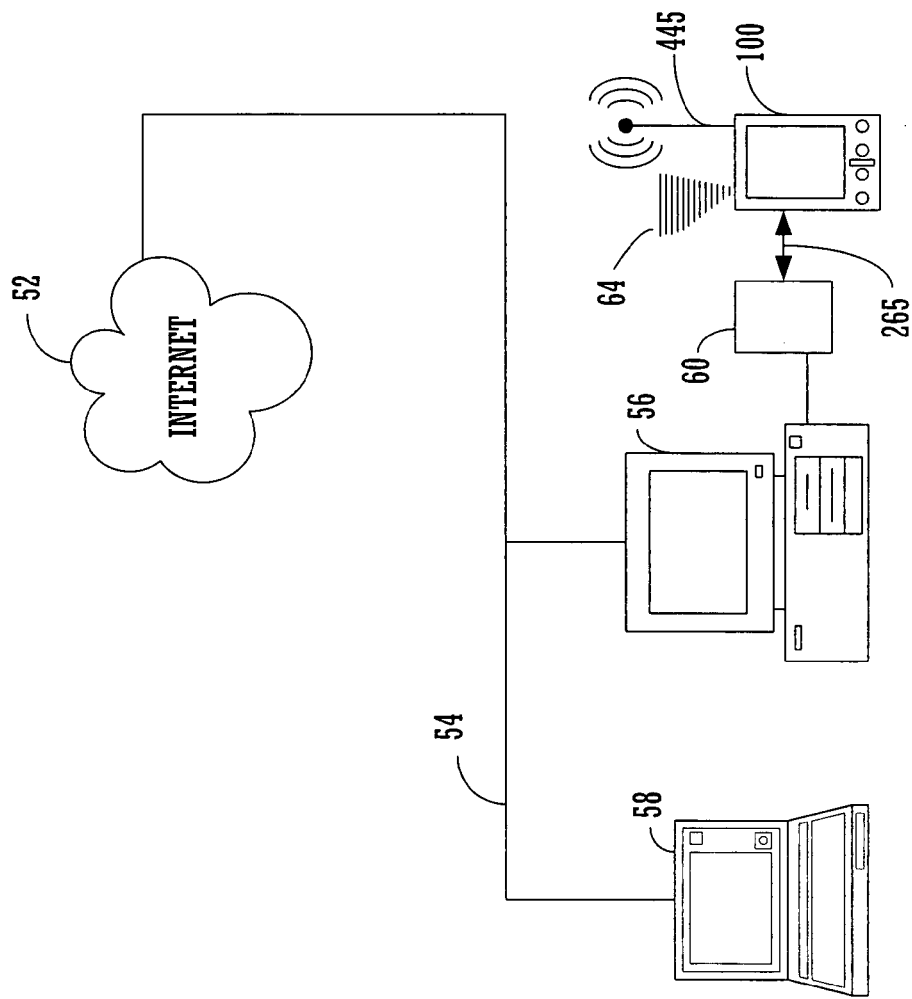
FIG. 1 is an illustration of a palmtop or "palm sized" computer system connected to other computer systems and the Internet via a cradle device.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, data, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are particularly applicable to portable electronic devices that have display screens and that include a connection to a wireless communication network. These devices include, for instance, cell phones, pagers and portable computer systems. Although applicable across a wide variety of platforms and devices, the present invention is described herein by example with respect to a portable computer system.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols.

Importantly, bus 54 is also coupled to a cradle 60 (or cable dock) for receiving and initiating communication with an exemplary palmtop ("palm-sized") portable computer system 100. Cradle 60 provides an electrical and mechanical communication interface between bus 54 (and anything coupled to bus 54) and the computer system 100 for two way communications. Computer system 100 may also contain a wireless infrared communication mechanism 64 for sending and receiving information to or from other devices.

Figure 2A:
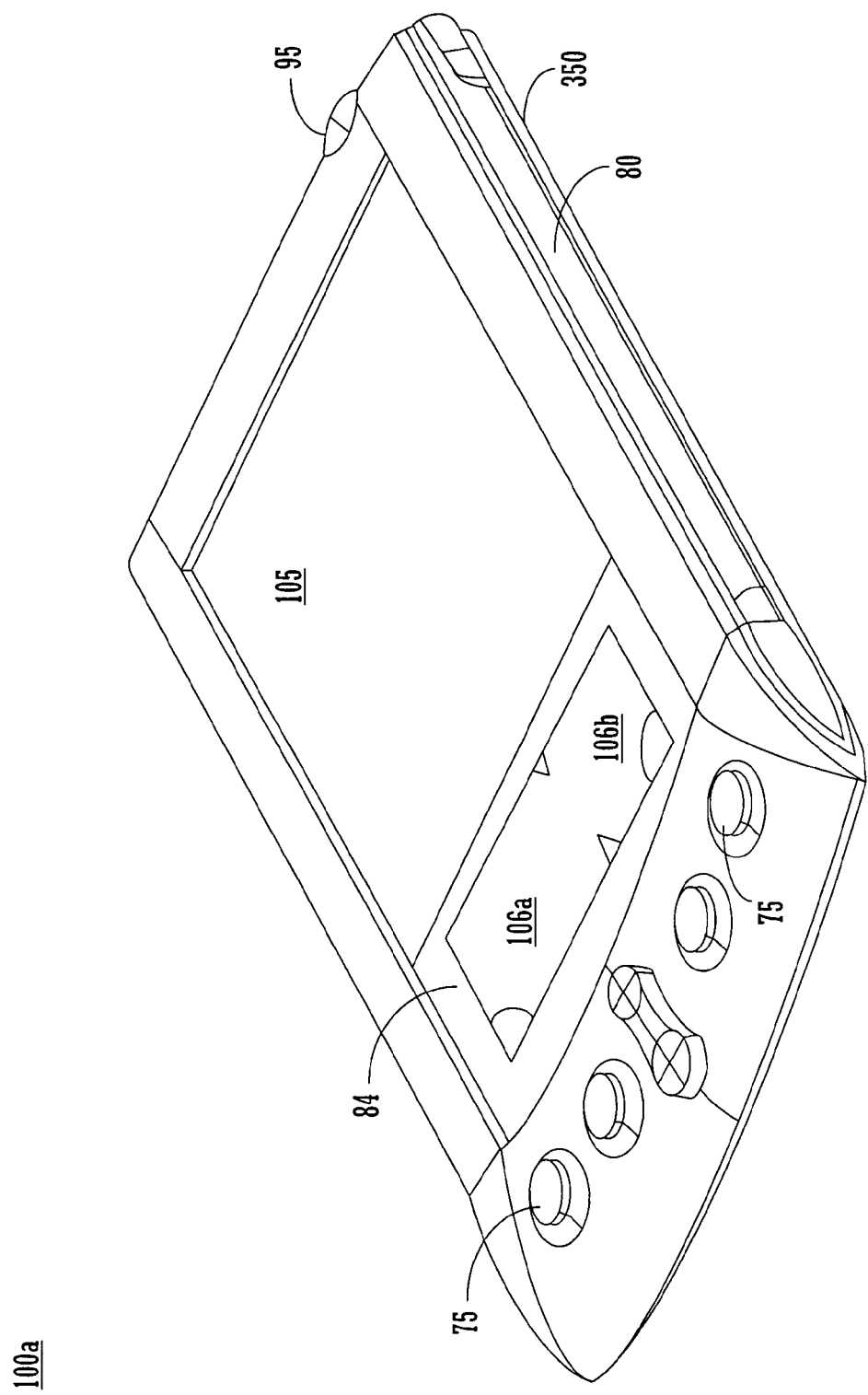
FIG. 2A is a top side perspective view of a palmtop computer system that can be used in one embodiment of the present invention.

FIG. 2A is a perspective illustration of the top face 100a of one embodiment of the palmtop computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. Other buttons (icons) can be implemented within a silk screen layer material 84 on which regions 106a and 106b reside. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
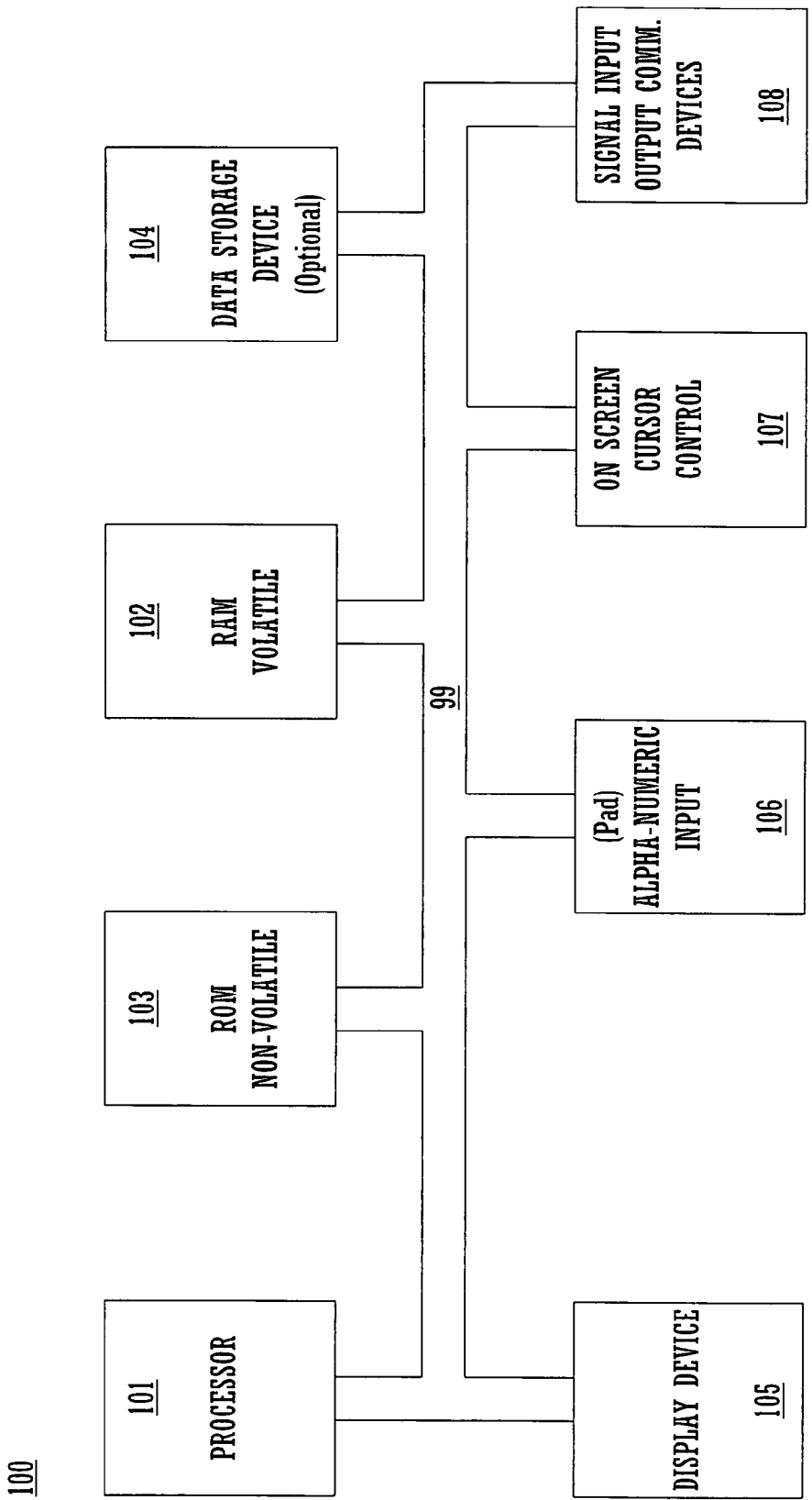
FIG. 5 is a logical block diagram of an exemplary palmtop computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

Figure 2B:
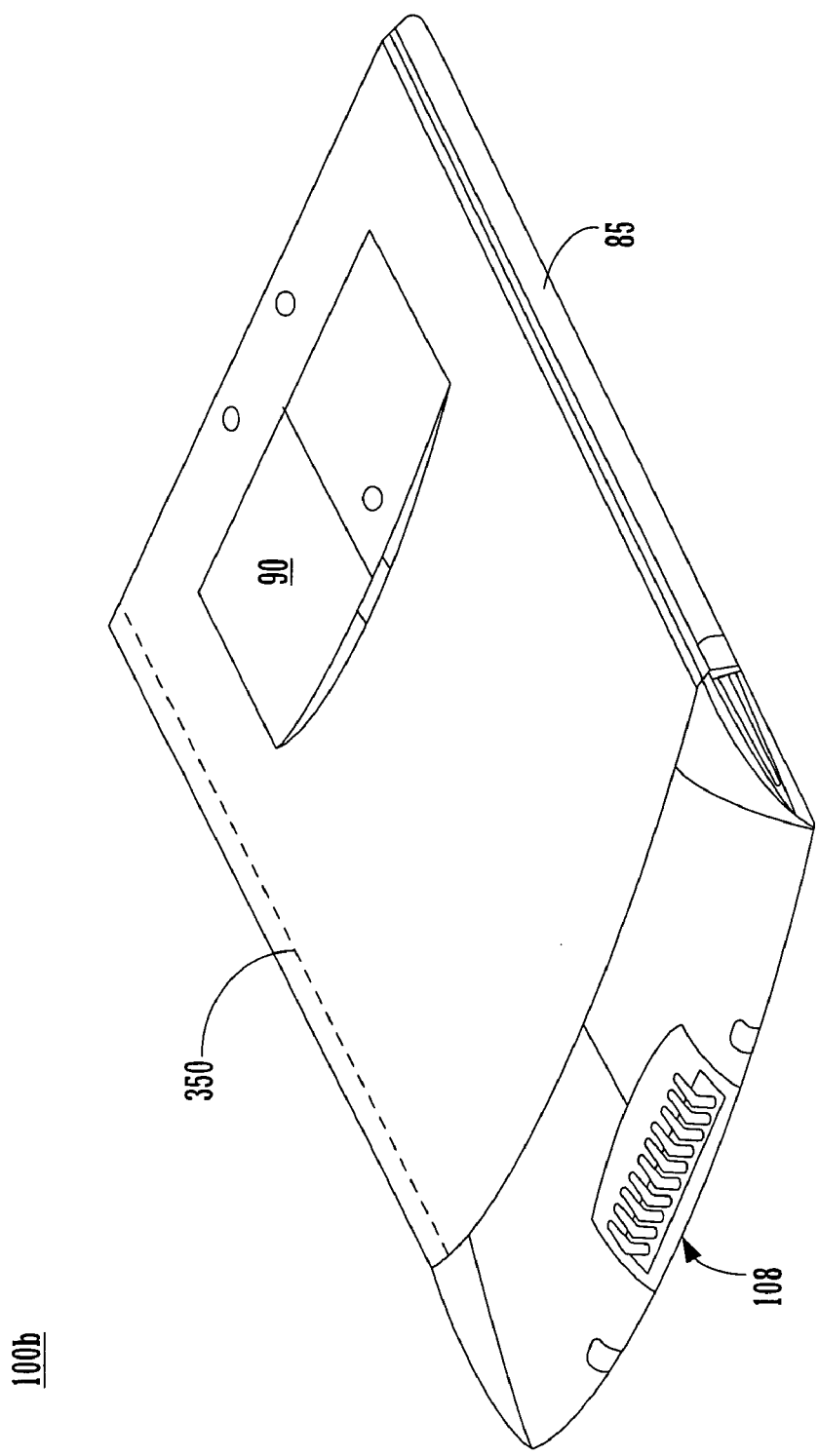
FIG. 2B is a bottom side perspective view of the palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 2C:
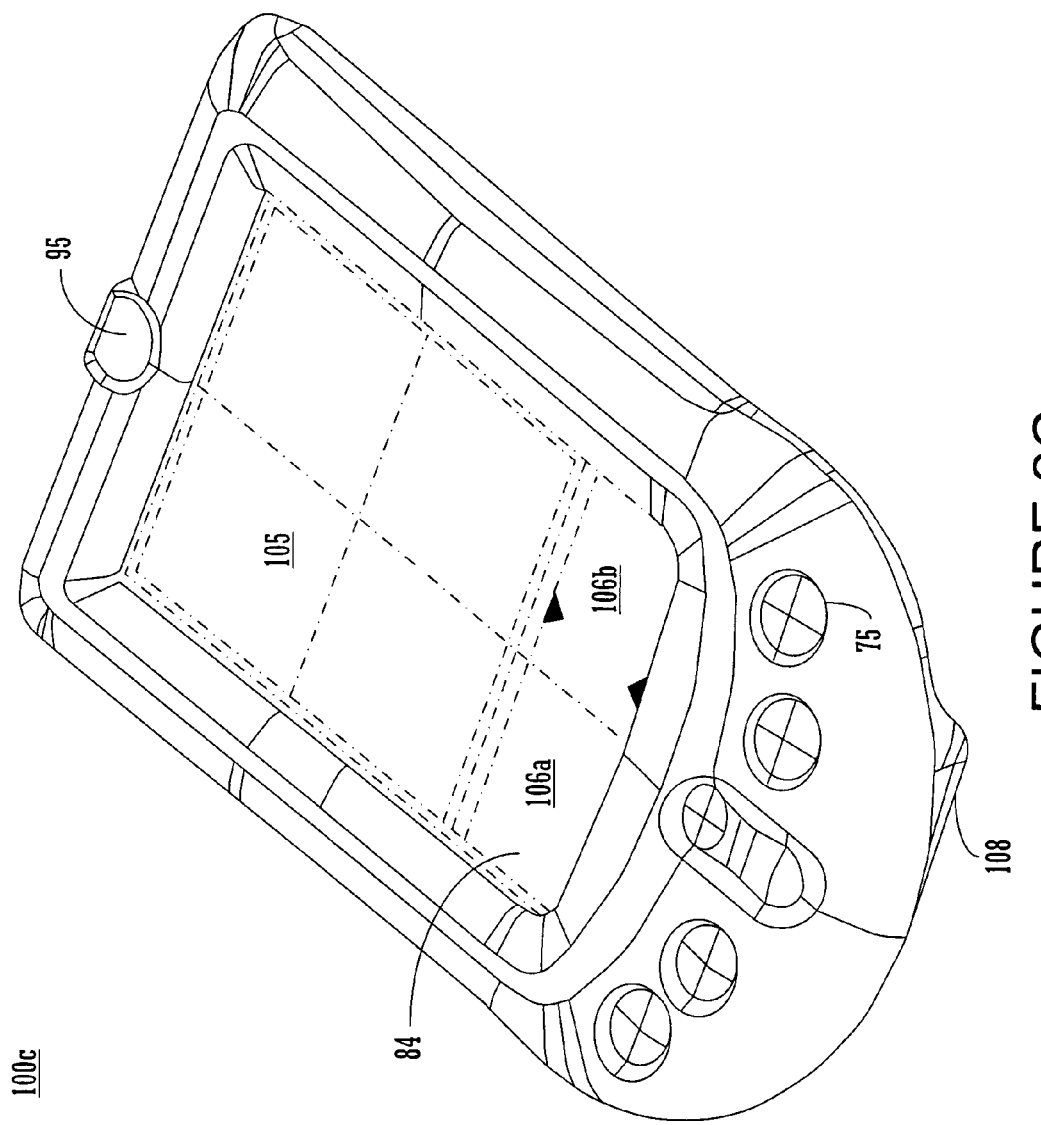
FIG. 2C is a perspective top view of another exemplary embodiment of a palmtop computer system.

FIG. 2C illustrates a front perspective view of another implementation 100c of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

Figure 3:
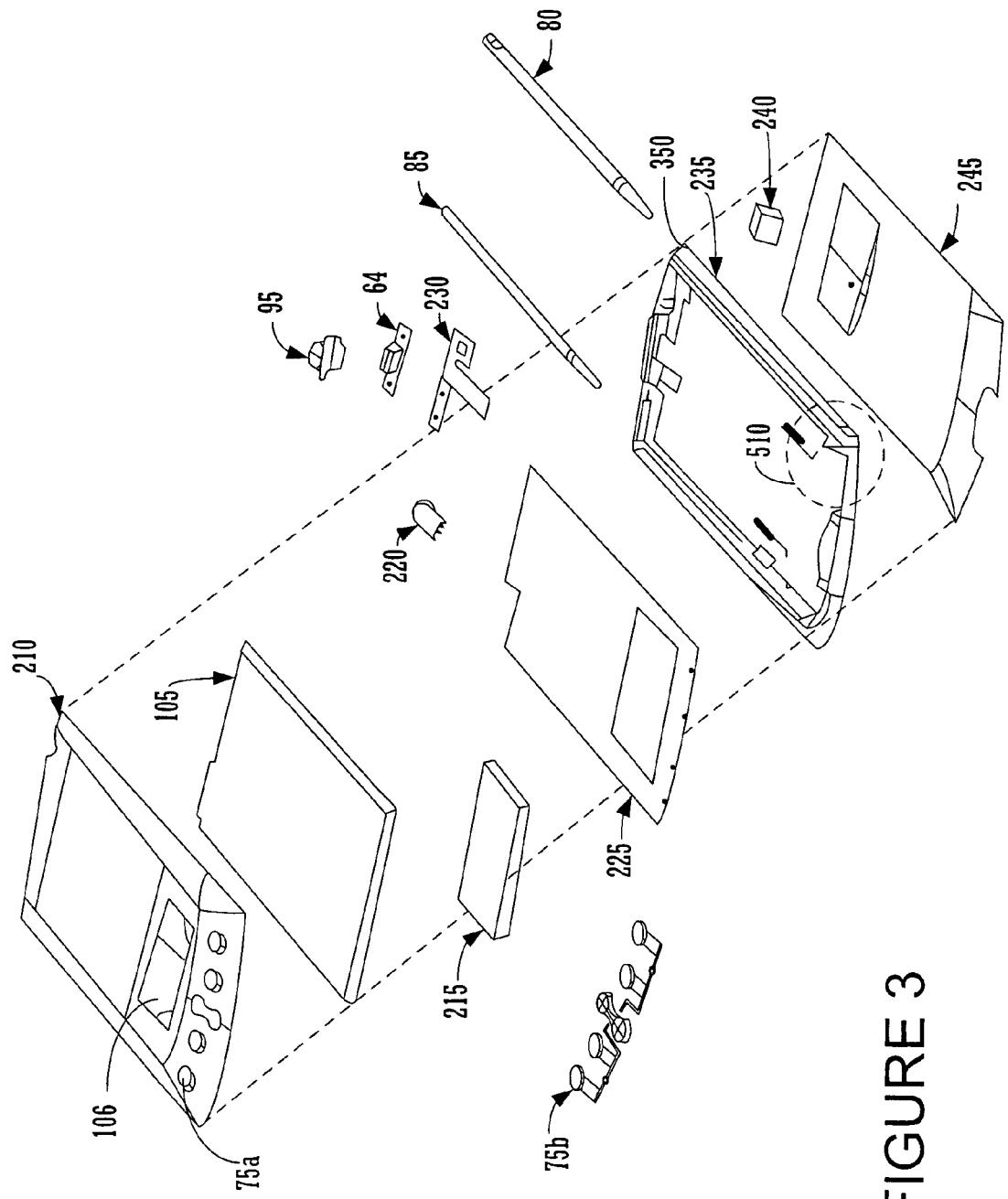
FIG. 3 is an exploded view of the components of an exemplary palmtop computer system of FIG. 2A.

FIG. 3 is an exploded view of the exemplary palmtop computer system 100. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. A contrast adjustment (potentiometer) 220 is also shown but can also be implemented electronically, e.g., by software, (FIG. 2C) without any manual knob. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Optional position adjustable antenna 85 is shown. The midframe 235 contains the stylus receiving slot or rail 350.

An optional radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
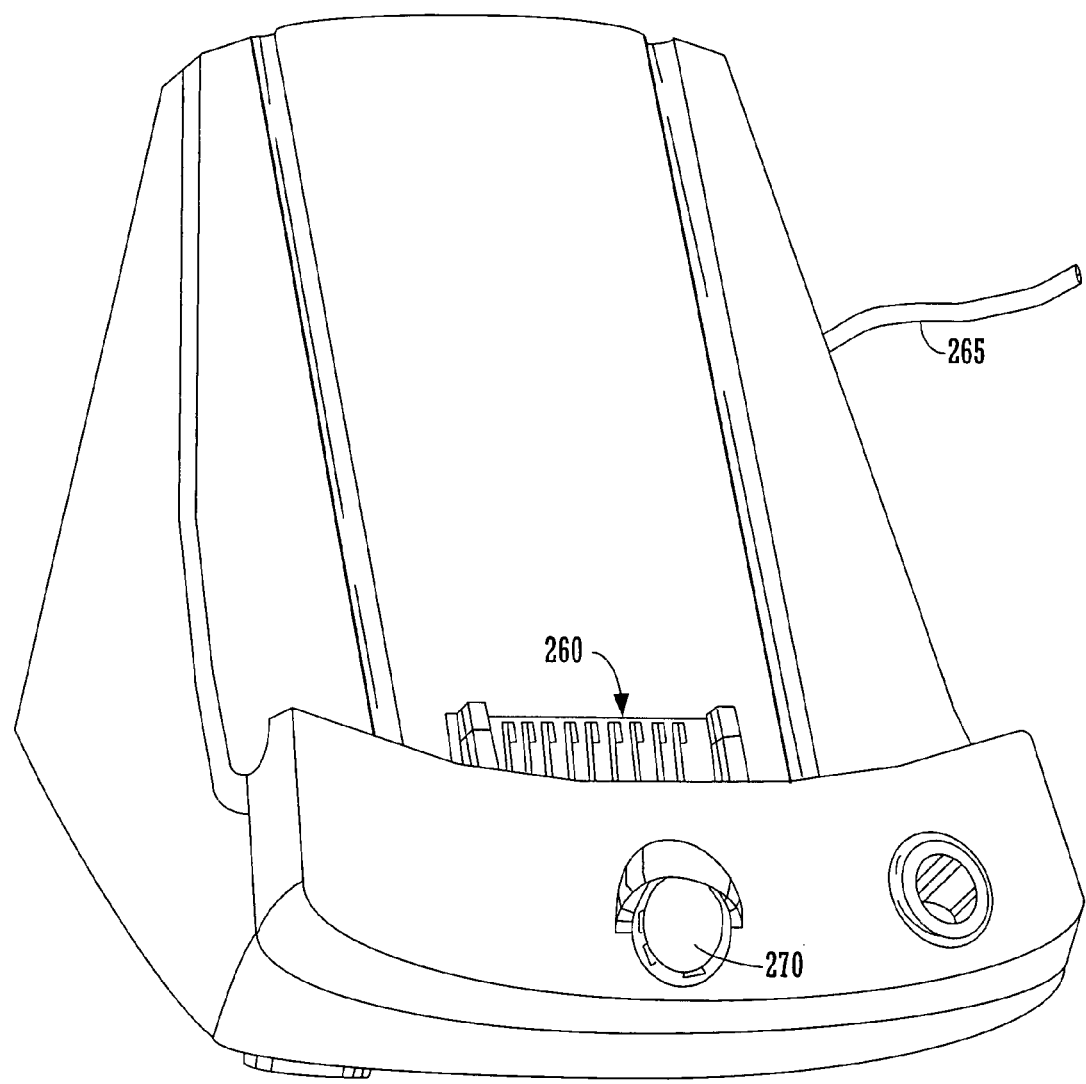
FIG. 4 is a perspective view of a cradle device for connecting a palmtop computer system to other systems via a communication interface.

FIG. 4 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

FIG. 5 illustrates circuitry of palmtop computer system 100, some of which can be implemented on PC board 225. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In one embodiment, the display 105 utilizes color sequential scanning but could also utilize color filters with subpixels.

Signal communication device 108, also coupled to bus 99, can be a serial port for communicating with the cradle 60. Device 108 can also include an infrared communication port.

Figure 6:
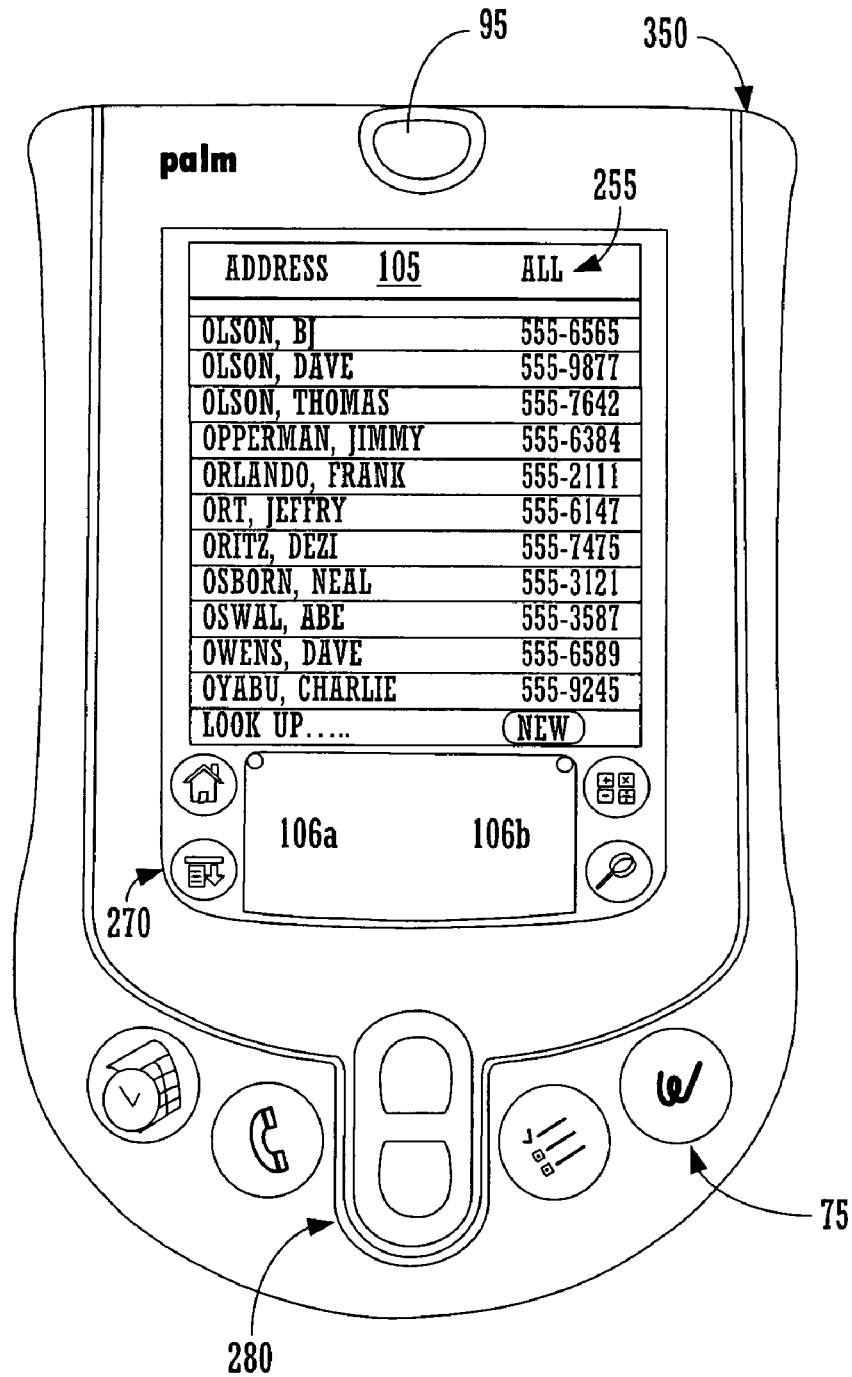
FIG. 6 is a front view of an exemplary palmtop computer system.

FIG. 6 illustrates device 100 which contains several icons 270 printed on the silk screen layer. These icons, e.g., a home icon, a menu icon, a calculator icon and a finder icon, are user selectors and when tapped with the stylus these icons cause certain applications to be executed or invoke menu options within applications that are currently being displayed. Also shown is a scroll selector 280. Scroll selector 280 has an up button and a down button to cause list scrolling on the display 105.

Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the device is also operable within a single region that recognizes both alphabetic and numeric characters. It is appreciated that, in one embodiment, the digitizer region 106a and 106b are separate from the display screen 105 and therefore does not consume any display area. Also shown in FIG. 6 is the position of the stylus receiving slot or rail 350. It is appreciated that while the stylus receiving slot or rail 350 is depicted on the right of the computer 100, it can also be deployed on the left or along the top edge or along the bottom edge.

Figure 7:
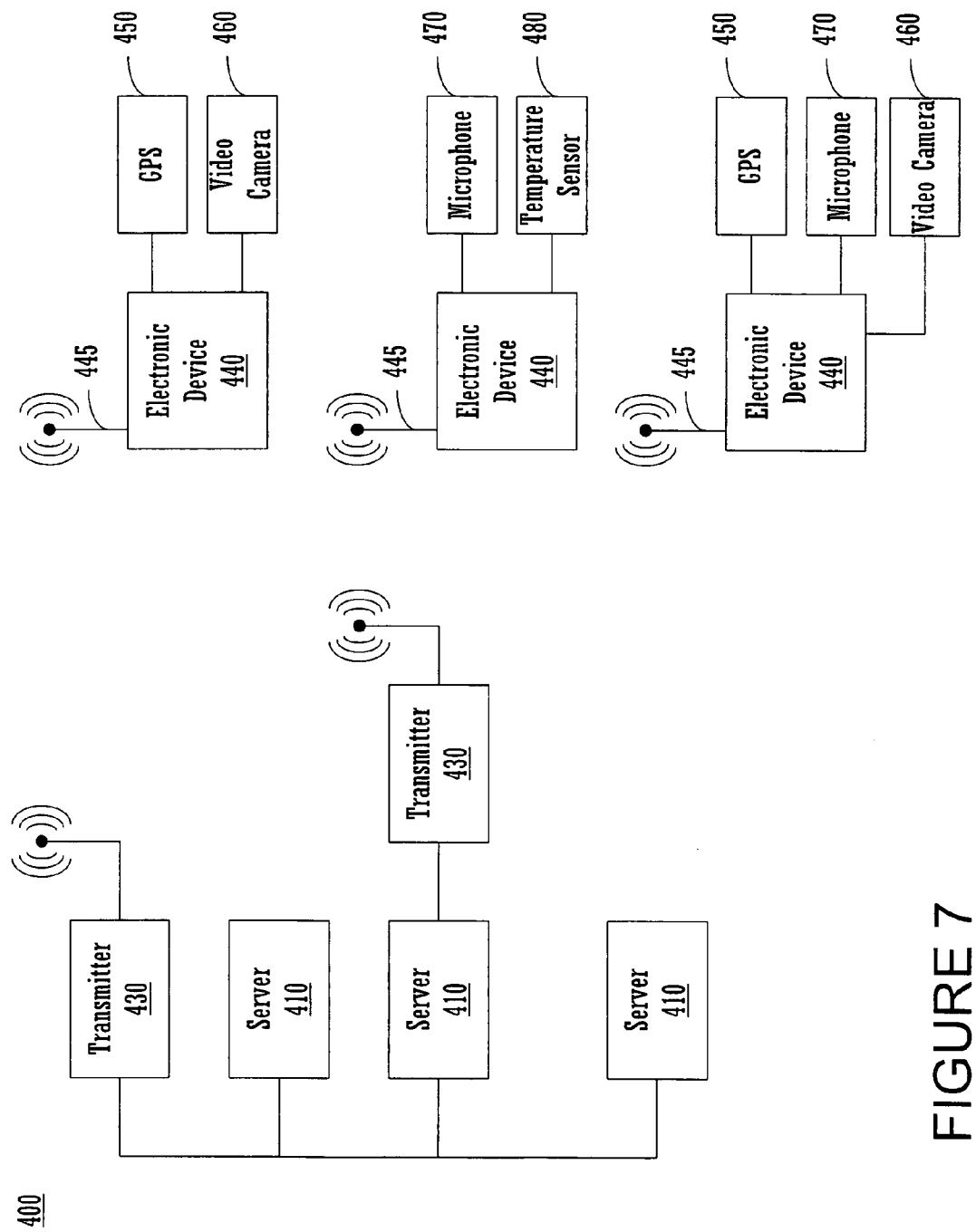
FIG. 7 is the system of the present invention, showing a plurality of computer servers communicating with a plurality of electronic devices via a wireless communication link.

Wirelessly Networked Distributed Resource Usage for Data Gathering in Accordance with Present Invention FIG. 7 shows a system 400 including of a plurality of computer servers 410 connected to a computer network 420, possibly the Internet or a private network. The servers 410 can be directly connected to a wireless transmitter 430, or can communicate with a wireless transmitter 430 over the computer network 420. The transmitters 430 operate in full duplex mode, and can be standard cell phone transmission systems. FIG. 7 also shows a plurality of electronic devices 440, each including an antenna 445 and the capability to communicate via a wireless communication network with the computer servers 430. Shown as attached to each of the electronic devices 440 are a variety of input/output devices including: a GPS 450, a video camera 460, a microphone 470, and a temperature sensor 480. Many other types of input/output devices are possible, as described above. The input/output devices can be either attachments to the electronic devices 440 (as implied in FIG. 7) or integrated into the electronic devices themselves. The figure illustrates that each electronic device 440 can be equipped with different input/output peripherals, and the present invention includes methods for handling this diversity. This is needed because, for example, if geographically distributed temperature data is to be gathered, then only electronic devices 440 with temperature sensors 480 can be used to gather the data. The system can include a single computer server 410.

The present invention provides four modes for the system 400 shown in FIG. 7 to collect geographically distributed data: (1) gathering geographically distributed data in a server-commanded mode, accomplished by a computer server 410 commanding electronic devices 440 to capture and transmit data, such that the user of the electronic device 440 need not participate in the capturing or transmitting, and is, therefore transparent to the user; (2) collecting user responses in a server-initiated mode, accomplished by a computer server 410 requesting the user of an electronic device 440 to input data, the data then transmitted to the server 410; (3) supplying geographically distributed data in a user-initiated mode, accomplished by a user capturing data with an electronic device 440, the electronic device 440 transmitting the data to a computer server 410, and the computer server 410 then storing, selling, or publishing the data; and (4) supplying geographically distributed data in a user-controlled mode, accomplished by a user enabling his electronic device 440 to automatically capture data, the electronic device 440 transmitting the data to a computer server 410, and the computer server 410 then storing or processing the data.

Mode 1: Gathering Data in Server-Commanded Mode

The first mode, gathering a body of geographically distributed data in a server-commanded mode, is useful for situations where the user of the electronic device 440 need not be bothered to respond. For example, assuming there are thousands of users with electronic devices 440 in their cars as they commute to work (with the electronic devices 440 turned on, enabled to participate in the gather of data, and equipped with a GPS), a computer server 410 can query all the electronic devices 440 for location and speed in order to generate a overall picture of traffic conditions. This overall picture could then be sent to the users, published on the Internet, or broadcast on television or radio. Similarly, temperature, sound, and even seismic activity could be gathered this way.

Figure 8:
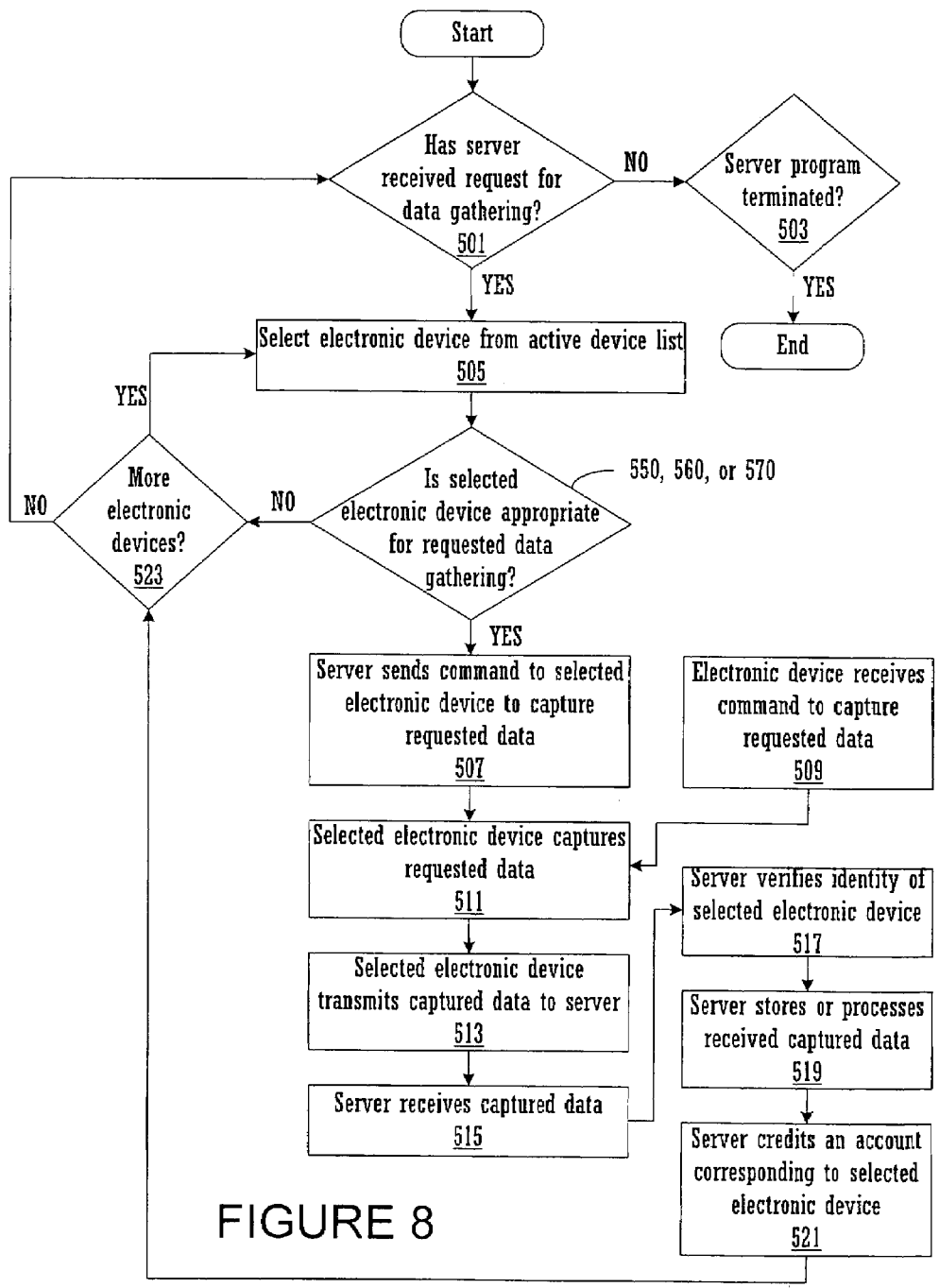
FIG. 8 is a flow diagram of a computer process in accordance with an embodiment of the present invention for gathering geographically distributed data in a server-commanded mode.

FIG. 8 shows a flow diagram for an embodiment of the method for gathering data in a server-commanded manner. The system 400 awaits 501, 503 a request to gather geographically distributed data. Continuing with the above traffic example, a radio station could make the request of the system 400 to determine the traffic status so it can be reported on the radio.

The system 400 needs to query enough of the electronic devices 440 to fulfill the overall request for data; which could mean querying every electronic device 440 in the system 400, or it could mean querying only enough to reach a particular objective (e.g., are there at least fifty cars traveling at more than one hundred miles per hour on Telegraph Road).

The computer servers maintain a list of electronic devices 440 that are turned on and enabled to receive commands. Hereinafter, this list is called the active device list, and it will be described later in this document as FIG. 12. A server 410 selects 505 an electronic device 440 from the active device list and begins communicating with it 440. If 550, 560, 570 the selected electronic device 440 is not appropriate for gathering the data, the process skips to the next electronic device 440. The server 410 sends 507 a command to the selected electronic device 440 for it 440 to capture one or more specific types of data. The selected electronic device 440 receives 509 the command and captures 511 the data. The selected electronic device 440 transmits 513 the data to the server 440, where it is received 515. An important, but optional, step is the verification 517 of the identity of the electronic device 440, and this verification 517 can occur at almost any point during the communication between the server 410 and the selected electronic device 440. After receiving 515 the data, the server 410 stores and/or processes 519 the received data. Another important, but optional, step is the crediting 521 of an account corresponding to the selected electronic device 440. This crediting 521 gives the user of the electronic device 440 an incentive to leave the device on and enabled to receive data gathering commands. The credit can be any combination of money, award points (redeemable, like frequent flier miles), or discounts on merchandise. The electronic device 440 can keep track of a user's account balance, in addition to the server 410. The server 410 then selects 505 a next electronic device 440 if 523 another device is available or needed.

FIG. 8 shows the process of querying electronic devices 440 as a serial process, but this is only for ease of illustration. Commands to capture 507 data can be sent to multiple electronic devices 440, so that multiple commands are "in flight" simultaneously. This allows sending of commands 507 and receiving 515 data to be interleaved across multiple electronic devices 440. Another reason for interleaving commands 507 is to account for some electronic devices 440 not responding due to, for example, power failure and communication link outages (common with cell phone technology). When a device does not respond to a server 410 command 507, the server 410 detects this by detecting a "time-out" condition. That is, the electronic device 440 took too long to respond. Because this might be a common occurrence, it would be highly disadvantageous to query electronic devices 440 in a purely sequential fashion, because, a time-out condition would suspend the entire process.

Figure 9:
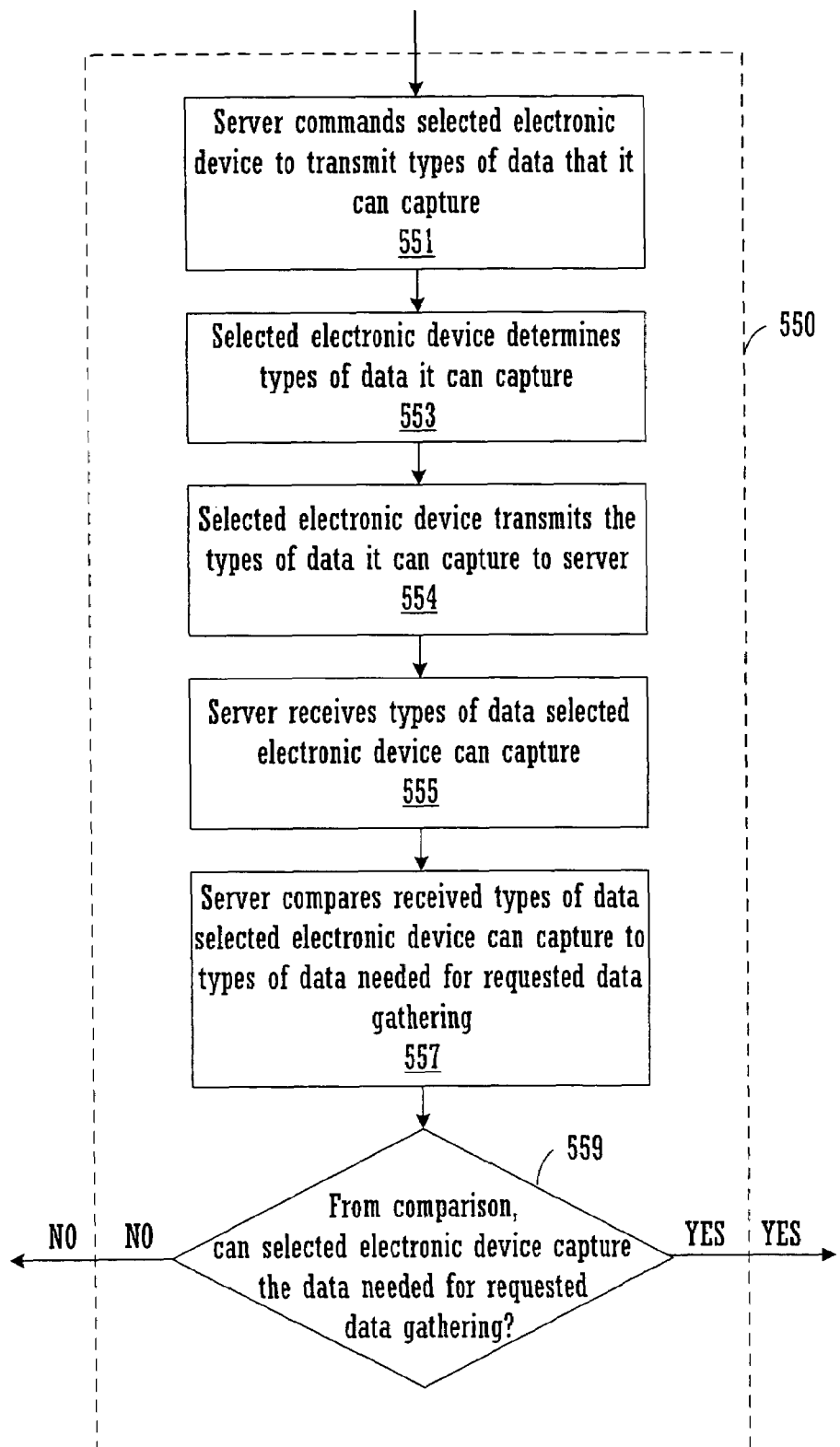
FIG. 9 is a flow diagram of a computer process in accordance with an embodiment of the present invention for determining whether an electronic device is appropriate for gathering a requested type of data, wherein the type of data an electronic device can capture is queried each time before the data is requested from the device.

FIG. 9 shows one embodiment for the decision 550 to skip a selected electronic device 440. The figure assumes a selected electronic device 440 is always interrogated as to the types of geographically distributed data it 440 can capture, the interrogation occurring prior to each time the electronic device 440 is commanded 507 to capture data. The server 410 commands 551 the selected electronic device 440 to transmit the types of data it can capture. The selected electronic device 440 determines 553 the types of data it 440 can capture and transmits 554 the types to the server 410 where it is received 555. The server compares 557 the received types to the data types that need to be captured. If 559 the comparison 557 indicates the selected electronic device 440 can not capture the needed data, that electronic device 440 is skipped. Alternatively, the electronic device 440 could be sent the data types that are needed, the comparison 557 could be performed in the electronic device 440, and the electronic device 440 could reply with an indication as to whether it can capture the needed data.

Figure 10:
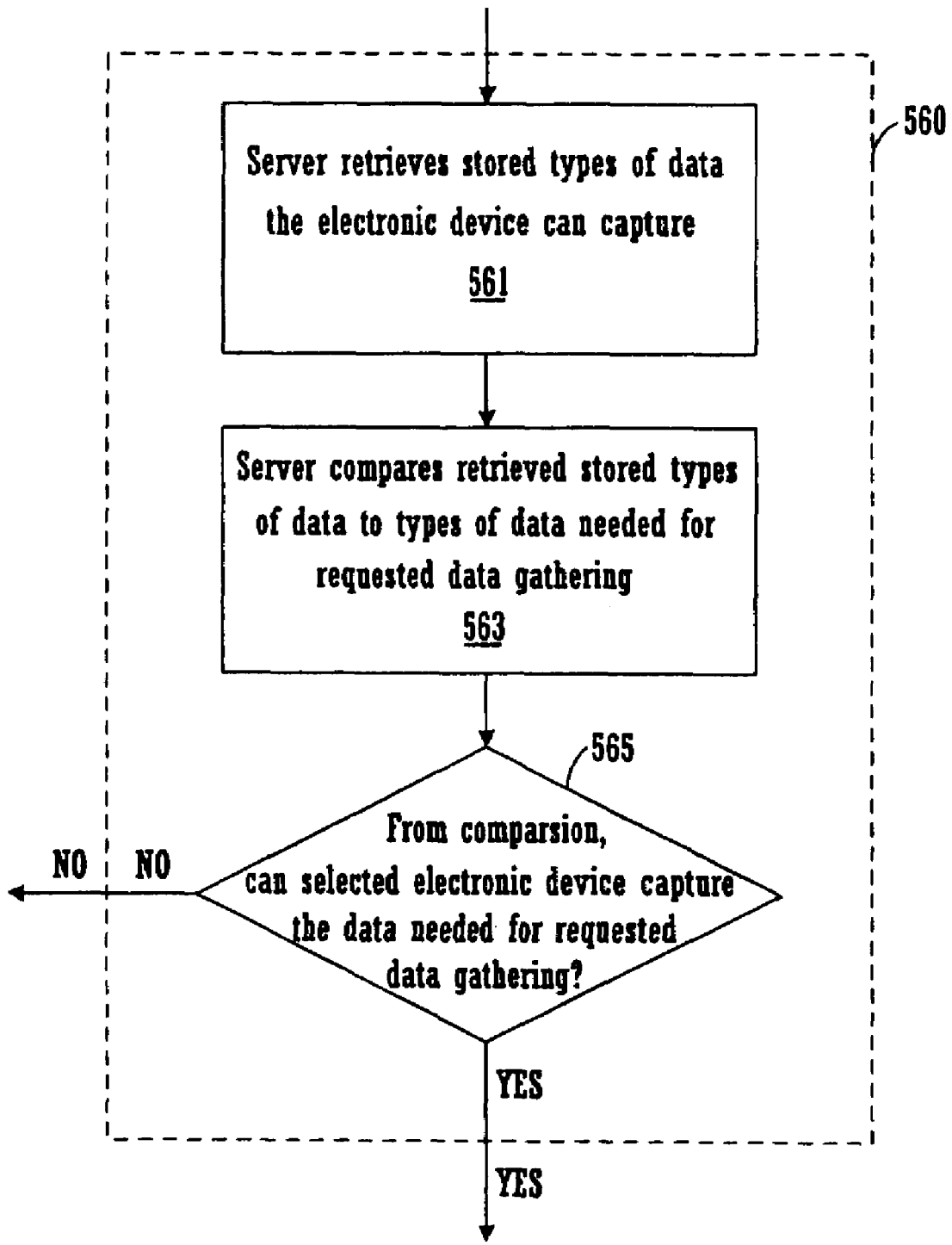
FIG. 10 is a flow diagram of a computer process in accordance with an embodiment of the present invention for determining whether an electronic device is appropriate for gathering a requested type of data, wherein the types of data each electronic device can capture is stored in a computer server.

FIG. 10 shows a second embodiment for the decision 560 to skip a selected electronic device 440. The figure assumes a server 410 stores the types of geographically distributed data that each electronic device 440 can capture. This list of types for each electronic device 440 can be included in the active device list or kept as a separate list. A server 440 retrieves 561 the stored types of data the selected electronic device 440 can capture, and compares 563 this to the data types that need to be captured. If 565 the comparison 563 indicates the selected electronic device 440 can not capture the needed data, that electronic device 440 is skipped.

Figure 11:
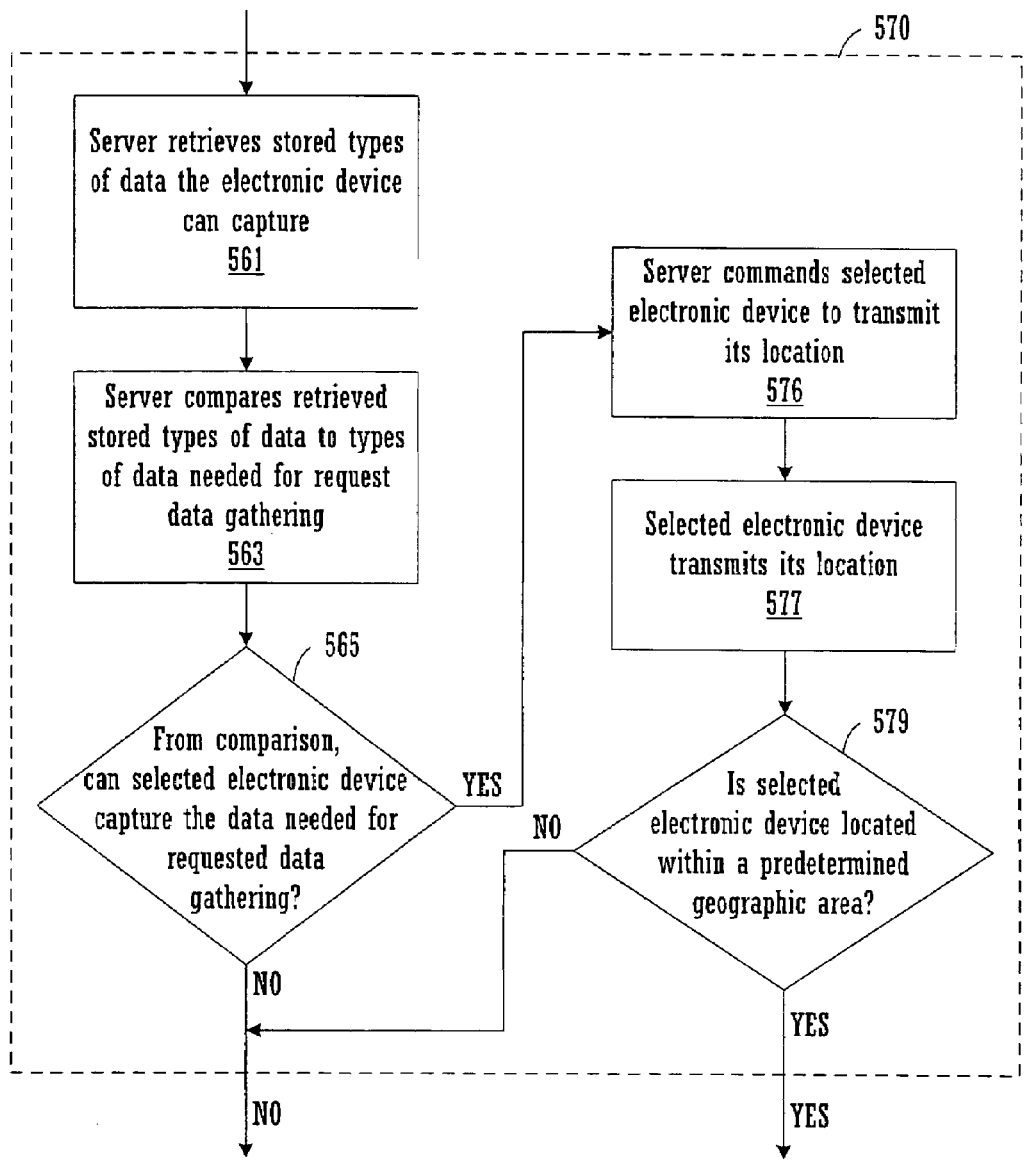
FIG. 11 is a flow diagram of a computer process in accordance with an embodiment of the present invention for determining whether an electronic device is appropriate for gathering a requested type of data, wherein the types of data each electronic device can capture is stored in a computer server and the location of the electronic device is considered.

FIG. 11 shows a third embodiment for the decision 570 to skip a selected electronic device 440. FIG. 11 is an expansion of the method shown in FIG. 10 because it adds the constraint that the selected electronic device 440 needs to be located within a predefined geographic area. Hence, FIG. 11 includes the steps 561, 563, and 565 from FIG. 10. FIG. 11 adds the steps of: the server 410 commanding 576 the electronic device 440 to transmit its location; the electronic device 440 transmitting 577 its location; and a decision 579 to skip the selected electronic device 440 based on whether it is located within the predetermined geographic area. The geographic area need not be spatially contiguous (it could be "any McDonald's restaurant"). Similarly, the constraint of the selected electronic device 440 needing to be located within a predefined geographic area can be added to the method illustrated in FIG. 9.

Figure 12:
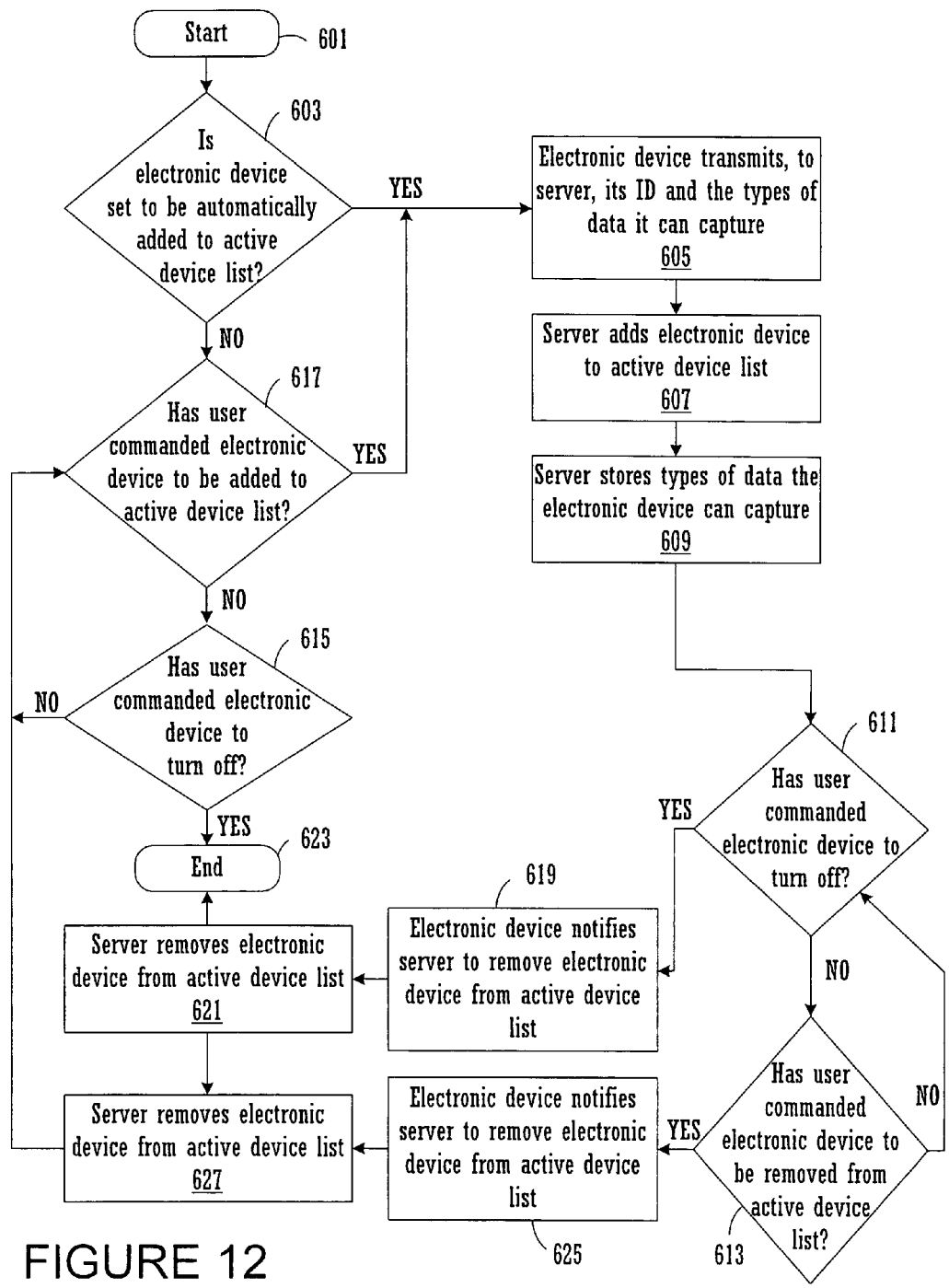
FIG. 12 is a flow diagram of a computer process in accordance with an embodiment of the present invention for maintaining an active device list.

FIG. 12 illustrates an embodiment for the method of maintaining the active device list. The figure shows how an electronic device 440 causes itself to be added or deleted from the active device list dependent on the users wishes and whether it has its power on. In this figure, "start" 601 is where the electronic device 440 executes the method when it is powered on. If 603 the electronic device 440 is set to be automatically added to the active device list when it is powered on, the electronic device 440 transmits 605 its identification to the server 410, along with the types of data it can capture (the data types it can capture are not sent if this data is not stored at a server 410, as in method 550), and the server 410 adds 607 this electronic device 440 to the active device list and stores 609 the data types the electronic device 440 can capture. The electronic device 440 then waits for either the user to command the electronic device 440 to turn off 611 or the user to command the electronic device 440 to be removed 613 from the active device list. If 603 the electronic device 440 is not set to be automatically added to the active device list, it 440 waits for either the user to command the electronic device 440 to turn off 615 or the user to command the electronic device 440 to be added 617 to the active device list. If 611 the user commands the electronic device 440 to turn off, the electronic device notifies 619 the server 410 to remove it from the active device list, the server does that 621, and the electronic device 440 turns off 623. If 613 the user commands the electronic device 440 to be removed from the active device list, the electronic device notifies 625 the server 410 to remove it from the active device list, the server does that 627, and then the electronic device 440 waits for either the user to command the electronic device 440 to turn off 615 or the user to command the electronic device 440 to be added 617 to the active device list. From FIG. 12, it is seen that the electronic device 440 resides in one of two states: (1) being included in the active device list and waiting for either the user to command the electronic device 440 to turn off 611 or the user to command the electronic device 440 to be removed 613 from the active device list; or (2) being not included in the active device list and waiting for either the user to command the electronic device 440 to turn off 615 or the user to command the electronic device 440 to be removed 617 from the active device list. The other steps in the figure are for transitions between these two states. In addition to these steps, the types of data the electronic device 440 can capture should be updated whenever the user changes the input/output devices that are attached.

In addition to the steps described above, encrypting any transmitted data can be done so as to keep it private.

Mode 2: Collecting Data in Server-Initiated Mode

The second mode, collecting user responses in a server-initiated mode, is useful for situations where input from the user is desired. For example, marketing surveys can be performed where it is up to the user as to whether he will respond. A particularly useful example is the requesting of opinions based on geographic location. For example, the user could be surveyed when leaving a particular type of restaurant (such as McDonald's) as to his experiences. Similarly, a survey could be taken of users located at a particular sporting event (such as the Super Bowl). These surveys could be accompanied by a sales pitch for a particular company or product. If a user participated in a survey collecting responses from people who just ate at McDonald's, an advertisement or coupon for Burger King could be sent to the user if his survey indicated any dissatisfaction. Hence, marketing data and sales could be done in a distributed fashion.

Figure 13:
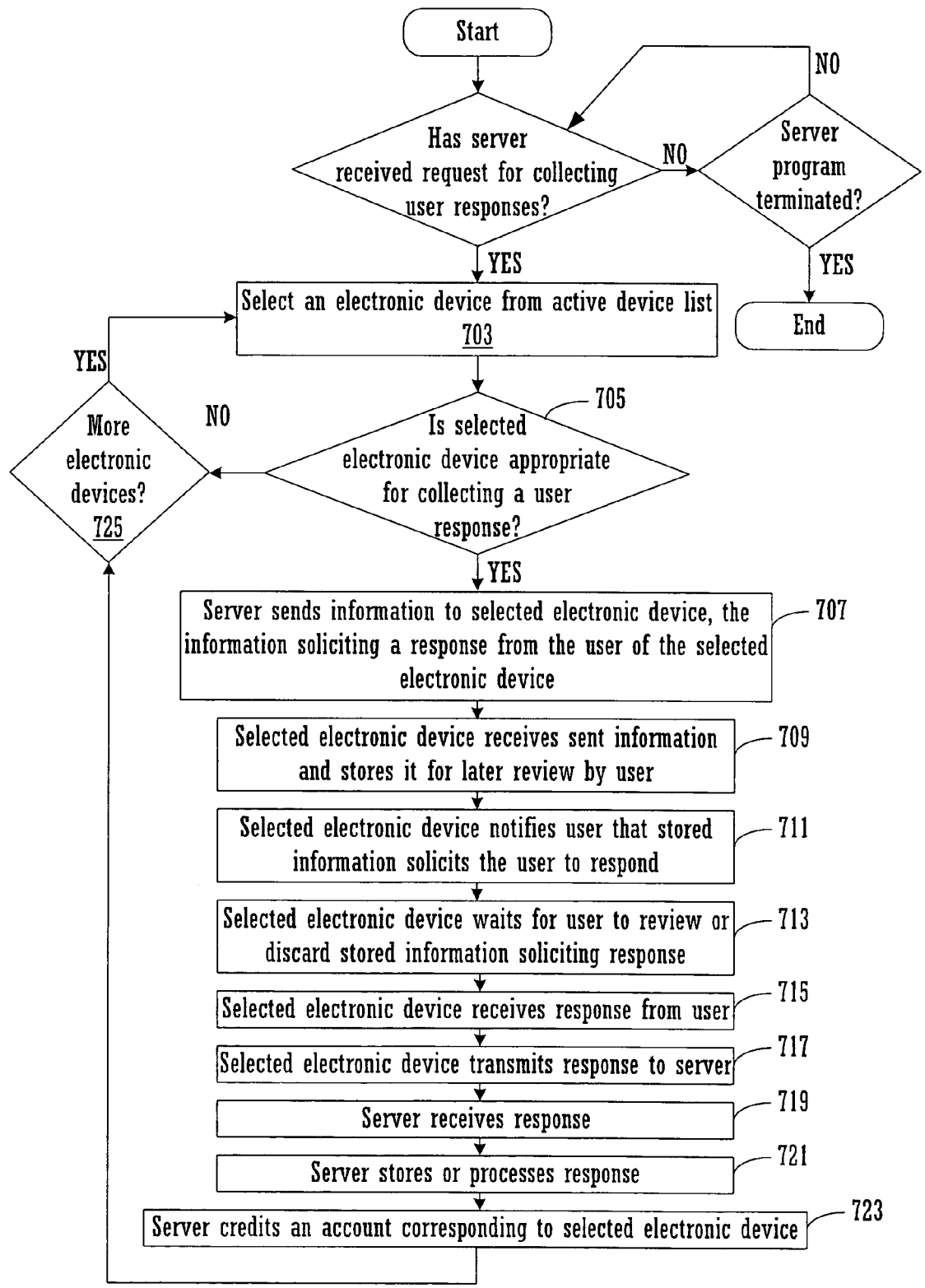
FIG. 13 is a flow diagram of a computer process in accordance with an embodiment of the present invention for collecting geographically distributed user responses in a server-initiated mode.

FIG. 13 shows a flow diagram for collecting user responses in a server-initiated manner. The system 400 awaits 501, 503 a request to gather user responses. Continuing with the above restaurant example, a continuous polling could be done to detect when a user exits the target restaurant. Or, a market survey company could request all users to respond to a particular survey.

The system 400 needs to query enough of the electronic devices 440 to fulfill the overall request for data; which could mean querying every electronic device 440 in the system 400, or it could mean querying only enough to reach a particular objective (e.g., query at least 100 people leaving McDonald's).

The computer servers maintain an active device list, as described above. A server 410 selects 703 an electronic device 440 from the active device list and begins communicating with it 440. If 705 the selected electronic device 440 is not appropriate for gathering the data, the process skips to the next electronic device 440 (in a similar manner to the methods 550, 560, or 570). The server 410 sends 707 information to the selected electronic device 440, the information soliciting a response from the user. The selected electronic device 440 receives 709 the information and notifies 711 the user. The selected electronic device 440 waits for the user to either review or discard 713 the information, and if the user responds, the electronic device 440 receives 715 the response and transmits 717 it to the server 410. The server 410 receives 719 the user response and stores or processes 721 the user response. An important, but optional, step is the verification of the identity of the electronic device 440, and this verification can occur at almost any point during the communication between the server 410 and the selected electronic device 440. Another important, but optional, step is the crediting 723 of an account corresponding to the selected electronic device 440. This crediting 723 gives the user of the electronic device 440 an incentive to participate in the collecting of user responses. The credit can be any combination of money, award points (redeemable, like frequent flier miles), or discounts on merchandise. The electronic device 440 can keep track of a user's account balance, in addition to the server 410. The server 410 then selects 703 a next electronic device 440 if 725 another device is available or needed.

As an alternative to the steps of FIG. 13, the server 410 may transmit a request of the user to respond and only send a small portion of the information to which he will respond (as a hint for what the survey is about). Then, when the user indicates he wishes to review all the information, the rest is transmitted. This alternate approach can save bandwidth usage over the wireless communications network.

FIG. 13 shows the process of querying electronic devices 440 as a serial process, but this is only for ease of illustration. Just as described above, commands and data transmission can be interleaved. This is particularly important in FIG. 13 because a user may take a long time to respond, and, in fact, may never respond.

As described above, encrypting of transmitted data can be done.

Mode 3: Supplying Data in User-Initiated Mode

The third mode, supplying geographically distributed data in a user-initiated mode, is useful for situations where the user of the electronic device 440 wants to capture data that is local to him and distribute it to a wider audience. For example, the user of an electronic device 440 could be the witness of an accident, and use his electronic device 440 to capture video images (assuming the electronic device 440 includes a video capture mechanism), upload them immediately to a computer server 410, and then the computer server 410 can distribute or publish the video images as necessary. This mode of operation makes the user of an electronic device 440 a roving reporter. The invention also includes methods for reviewing the submitted data before it is distributed or published. The review is important to filter out inappropriate, uninteresting, and redundant news.

Figure 14:
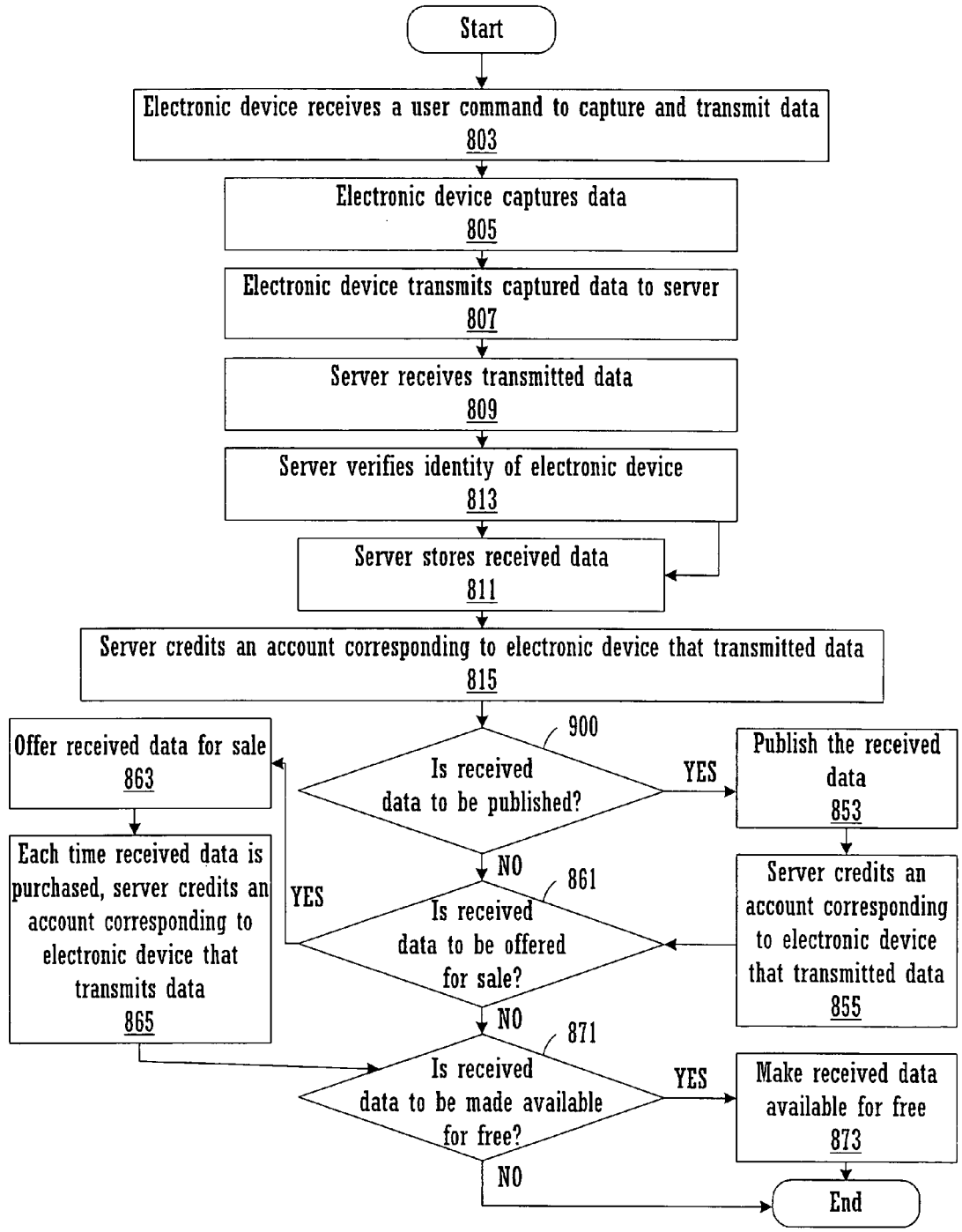
FIG. 14 is a flow diagram of a computer process in accordance with an embodiment of the present invention for users to supply geographically distributed data to a server in a user-initiated mode.

FIG. 14 shows a flow diagram for supplying geographically distributed data in a user-initiated manner. The user commands 803 the electronic device 440 to capture and transmit data, generally something of interest to someone other than himself. The electronic device 440 captures 805 and transmits 807 the data. The server 410 receives 809 and stores 811 the data. An important, but optional, step is the verification 813 of the identity of the electronic device 440, and this verification 813 can occur at almost any point during the communication between the server 410 and the electronic device 440. Another important, but optional, step is the crediting 815 of an account corresponding to the electronic device 440. This crediting 815 gives the user of the electronic device 440 an incentive to supply geographically distributed data. Once the data is received 811, if 900 it is to be published, it is published 853, possibly on the Internet, television, or radio. Generally, a server 410 credits 855 an account corresponding to the electronic device as a reward for supplying data worthy of being published. If 861 the received data is to be offered for sale 863, each time 865 the received data is purchased, a server 410 credits 855 an account corresponding to the electronic device 440. The data can also be offered for free 871, 873.

Figure 15:
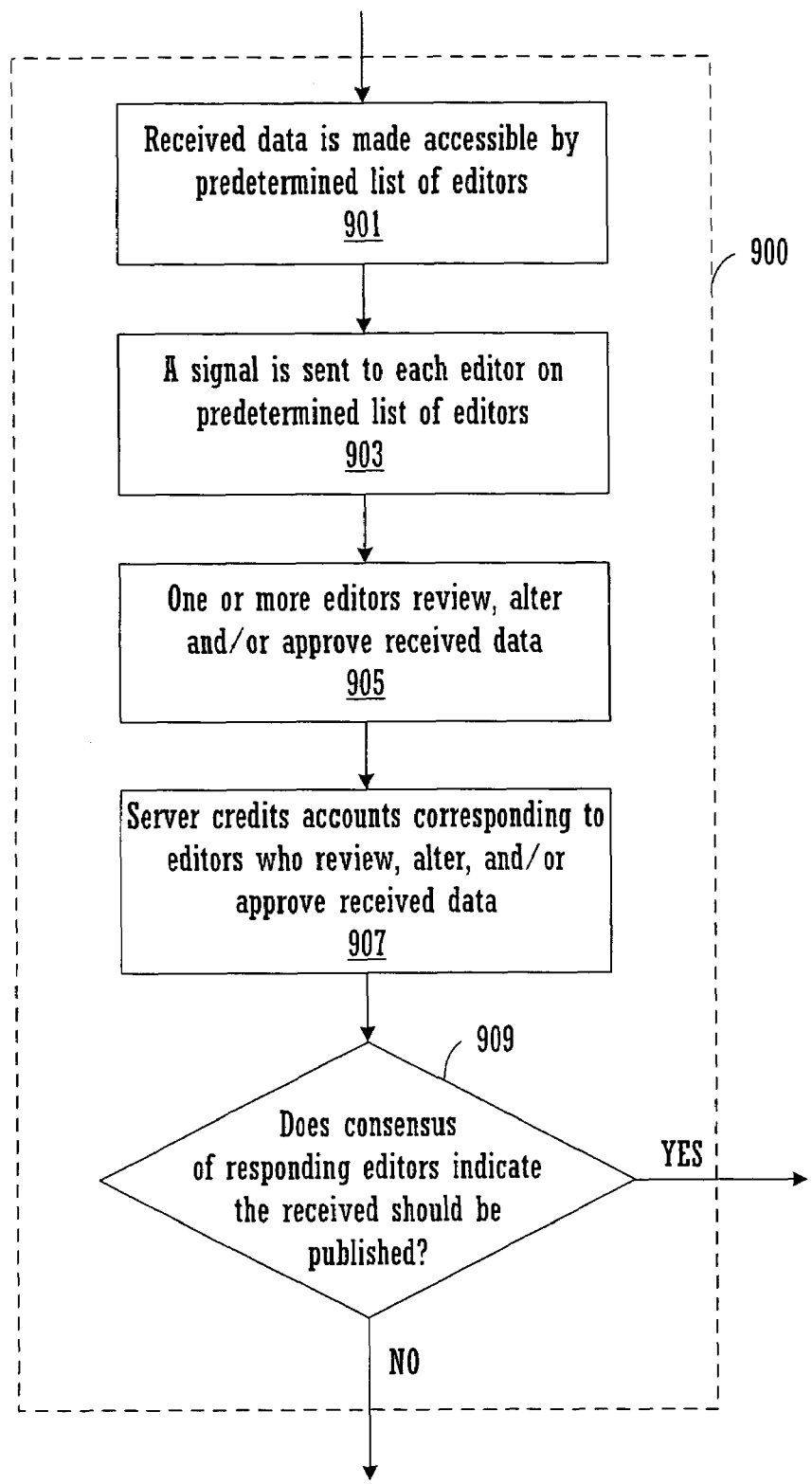
FIG. 15 is a flow diagram of a computer process in accordance with an embodiment of the present invention for editors to review supplied geographically distributed data.

The present invention also includes a method 900 for editors to review data before it is published or offered for sale, as shown in FIG. 15. The data received 811 by the server 410 is made accessible 901 to a set of editors. This 901 can be done by granting electronic access to the data as it resides on a server, and such access should be password protected. A signal is sent 903 to each editor, which can be done via email or by sending a command to an editor's electronic device 440. However, the editors can use any type of computing device, such as desktop computers and laptops. One or more of the editors review, alter, and/or approve 905 the received data for publishing, and the server 410 credits 907 their accounts appropriately. If 909 the consensus of the editors is to publish the data, then it will be published 853. Similar editor review methods can be applied to the sale decision 861 and the free availability decision 871.

Mode 4: Supplying Data in User-Controlled Mode

Figure 16:
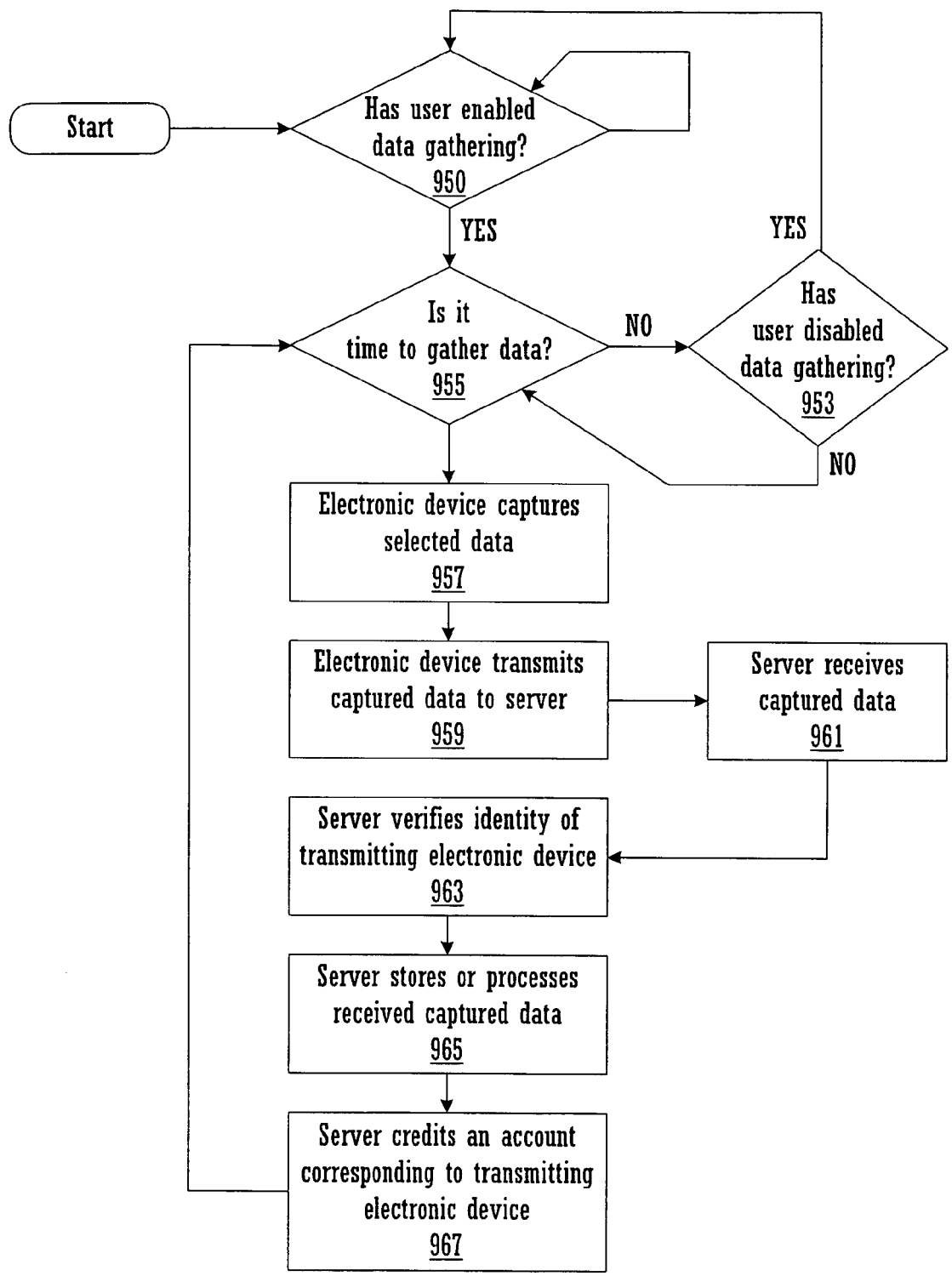
FIG. 16 is a flow diagram of a computer process in accordance with an embodiment of the present invention for gathering geographically distributed data in a user-controlled mode.

The gathering a body of geographically distributed data in a user-controlled mode is useful for situations where the user of the electronic device 440 does not directly participate in the gather of data, but has the electronic device automatically transmit the gathered data without receiving a command from the server 410. In other words, the electronic device 440 periodically captures data without intervention from the user. As seen in FIG. 16, the electronic device 440 recognizes whether the user has enabled 950 or disabled 953 the gathering of data. The user can also select the types of data he wishes to transmit and the time of day or periodicity of transmissions. The electronic device 440 has a timer set so as to cause the capturing of data. When it is time to capture data 955, the electronic device 440 captures 957 the types of data as selected by the user. The electronic device 440 transmits 959 the captured data to the server 410, and the server 410 receives 961 the captured data. The server 410 verifies 963 the identity of the transmitting electronic device, and stores or processes 965 the received data. The server 410 credits 967 value to an account corresponding to the transmitting electronic device.

Collecting and Transmitting Data

In all the modes, the transmitted data can be encrypted. This provides privacy to the user.

In all four of the above described modes of collecting geographically distributed data, the type of can be one or more of the following: position, velocity, acceleration, temperature, altitude, air pressure, direction, audio, video, still pictures, vibration, and time of day. In addition to these, any other type of data that can be captured by a computer can be collected by the above methods.

The preferred embodiment of the present invention, wirelessly networked distributed resource usage, is thus described. While the present invention has been described in particular embodiments, it should be appreciated that the present invention should not be construed as limited by such embodiments, but rather construed according to the below claims.

What is claimed is:
1. A system, comprising:
one or more computer servers configured to receive location data of a plurality of handheld electronic devices using a wireless network, generate automobile traffic information using the received location data of the plurality of handheld electronic devices, and provide the automobile traffic information generated to a computer;
wherein the one or more computer servers are configured to store identification data for the plurality of handheld electronic devices, receive from the plurality of handheld electronic devices an indication of the type of location data each of the plurality of handheld electronic devices is configured to capture, compare the type of location data each of the plurality of handheld electronic devices is configured to capture to a desired type of location data, and determine whether the plurality of handheld electronic devices are appropriate to contribute to the automobile traffic information based on whether each of the handheld electronic devices is configured to capture the desired type of location data; and wherein the one or more computer servers are configured to select the plurality of handheld electronic devices for generating the automobile traffic information based on the determination.

2. The system of claim 1, wherein the automobile traffic information is provided to a computer hosting an Internet site.

3. The system of claim 1, wherein the one or more computer servers are further configured to request the location data from the plurality of handheld electronic devices.

4. The system of claim 1, wherein the determination is made based further on whether the location of the handheld electronic devices are within a predefined geographic area.

5. The system of claim 1, wherein the one or more computer servers are further configured to encrypt the location data so as to keep it private.

6. The system of claim 1, wherein the one or more computer servers are further configured to maintain a list of active handheld electronic devices and to add and subtract handheld electronic devices from the list.

7. The system of claim 1, wherein the one or more computer servers are further configured to receive at least one of speed, altitude, direction and time of day data of the plurality of handheld electronic devices.

8. The system of claim 1, wherein the one or more computer servers are further configured to receive a request from the computer for automobile traffic information.

9. The system of claim 1, wherein the one or more computer servers comprise a plurality of servers, wherein at least one server is connected to a wireless transmitter, wherein the at least one server is configured to maintain a list of the plurality of handheld devices.

10. The system of claim 9, wherein the at least one server is configured to verify the identity of at least one handheld electronic device.

11. The system of claim 1, wherein the one or more computer servers are configured to continuously receive the location data and to generate automobile traffic information using the received location data of the plurality of handheld electronic devices.

12. The system of claim 1, wherein the location data is collected transparent to users of the handheld electronic devices.

13. The system of claim 1, wherein the one or more computer servers is configured to provide the automobile traffic information to at least one of the handheld electronic devices.

14. The system of claim 1, wherein the one or more computer servers are configured to receive location data that is collected by each of the electronic devices and sent by the electronic device to the one or more computer servers.

15. The system of claim 1, wherein the one or more computer servers comprises a first server configured to collect information from a wireless communication system and to send data based on the information collected from the wireless communication system to a second server, the second server configured to generate automobile traffic information based on the location data.

16. The system of claim 15, wherein the wireless communication system is a cell phone transmission system.

17. The system of claim 1, wherein the one or more computer servers comprises a server configured to receive location data from a first cell phone transmission system, a server configured to receive location information from a second cell phone transmission system, and a server configured to generate automobile traffic information based on the location data received.

18. The system of claim 1, wherein the one or more computer servers are configured to provide automobile traffic information that indicates that traffic is flowing well.

19. The system of claim 1, wherein the one or more computer servers are configured to use a subset of available location data from a subset of available electronic devices that can provide relevant information to generate the automobile traffic information at least a portion of the time.

20. A system, comprising:
   means for providing location data associated with a plurality of handheld electronic devices using a wireless network;
   means for storing identification data for each of the plurality of handheld electronic devices;
   means for receiving from the plurality of handheld electronic devices an indication of the type of location data each of the plurality of handheld electronic devices is configured to capture;
   means for comparing the type of location data each of the plurality of handheld electronic devices is configured to capture to a desired type of location data;
   means for selecting the plurality of handheld electronic devices for generating the automobile traffic information based on the comparison; and
   means for generating automobile traffic information using the location data provided by the means for providing.

21. The system of claim 20, further comprising means for providing the automobile traffic information to a computer.

22. The system of claim 21, further comprising means for receiving a request from the computer for automobile traffic information.

23. The system of claim 20, further comprising means for encrypting the location data so as to keep it private.

24. The system of claim 20, further comprising means for maintaining a list of active handheld electronic devices and for adding and subtracting handheld electronic devices from the list.

25. A system for characterizing traffic conditions by processing location data of a plurality of wireless phones, comprising:
   one or more computer servers configured to store location data of the plurality of wireless phones, to generate automobile traffic information using the location data of the plurality of wireless phones, and to provide the automobile traffic information;
   wherein the one or more computer servers are configured to store identification data for each of the plurality of wireless phones, receive an indication of the type of location data each of the wireless phones is configured to capture, and select the plurality of wireless phones for generating the automobile traffic information based on comparing the type of location data each of the plurality of wireless phones is configured to capture to a desired type of location data.

26. The system of claim 25, wherein the one or more computer servers are configured to store speed data associated with the plurality of wireless phones.

27. The system of claim 26, wherein the one or more computer servers are further configured to identify whether the wireless phones are located within a predefined geographic area, to receive a request from a computer for automobile traffic information and to grant password-protected electronic access to the automobile traffic information.

* * * * *